US012599232B2

(12) United States Patent
Klinkenberg et al.

(10) Patent No.: US 12,599,232 B2
(45) Date of Patent: Apr. 14, 2026

(54) FURNITURE BODY HAVING A FRONT PANEL

(71) Applicant: PRONORM EINBAUKÜCHEN GMBH, Vlotho (DE)

(72) Inventors: Roger Klinkenberg, Voerendaal (NL); Thorsten Gösling, Bad Salzuflen (DE)

(73) Assignee: pronorm Einbauküchen GmbH, Vlotho (DE)

( * ) Notice: Subject to any disclaimer, the term of this patent is extended or adjusted under 35 U.S.C. 154(b) by 116 days.

(21) Appl. No.: 18/573,741

(22) PCT Filed: Jun. 22, 2022

(86) PCT No.: PCT/DE2022/000070
§ 371 (c)(1),
(2) Date: Dec. 22, 2023

(87) PCT Pub. No.: WO2022/268246
PCT Pub. Date: Dec. 29, 2022

(65) Prior Publication Data
US 2024/0225279 A1 Jul. 11, 2024

(30) Foreign Application Priority Data
Jun. 24, 2021 (DE) ..................... 10 2021 003 238.1

(51) Int. Cl.
*A47B 95/02* (2006.01)
*A47B 88/919* (2017.01)
(Continued)

(52) U.S. Cl.
CPC ............ *A47B 95/02* (2013.01); *A47B 88/919* (2017.01); *F21S 4/28* (2016.01); *F21V 21/40* (2013.01);
(Continued)

(58) Field of Classification Search
CPC ....... A47B 95/02; A47B 88/99; A47B 88/919; A47B 2095/024; A47B 2220/005;
(Continued)

(56) References Cited

U.S. PATENT DOCUMENTS 4,096,603 A * 6/1978 Klaus ........................ G09F 3/20
16/416
4,574,424 A * 3/1986 Reis ....................... A47B 95/02
16/DIG. 24
(Continued)

FOREIGN PATENT DOCUMENTS

CN 209769669 U 12/2019
DE 10064716 A1 6/2002
(Continued)

*Primary Examiner* — Jason W San
*Assistant Examiner* — Matthew J Sullivan
(74) *Attorney, Agent, or Firm* — Laurence A. Greenberg; Werner H. Stemer; Ralph E. Locher

(57) ABSTRACT

A front panel for a furniture body allows an end face of movable furniture parts provided with a handle rail, bar or strip to be gripped from behind. A chamber accommodates a lighting device and has a light exit opening. The one-piece front panel has a wall curved multiple times, a first end portion which supports the chamber, and a base connected to the other end of the wall. The base at least jointly forms a channel with a second end portion of the curved wall and a mounting plane. An item of furniture having a front panel is also provided.

11 Claims, 2 Drawing Sheets

(51) Int. Cl.

| | |
|---|---|
| ***F21S 4/28*** | (2016.01) |
| ***F21V 21/40*** | (2006.01) |
| ***F21V 33/00*** | (2006.01) |
| *F21W 111/08* | (2006.01) |
| *F21W 131/301* | (2006.01) |
| *F21Y 103/10* | (2016.01) |
| *F21Y 115/10* | (2016.01) |

(52) U.S. Cl.

CPC .... *F21V 33/0012* (2013.01); *A47B 2095/024* (2013.01); *A47B 2220/005* (2013.01); *A47B 2220/0075* (2013.01); *F21W 2111/08* (2013.01); *F21W 2131/301* (2013.01); *F21Y 2103/10* (2016.08); *F21Y 2115/10* (2016.08)

(58) Field of Classification Search

CPC .............. A47B 2220/0075; F21S 4/28; F21W 2111/08; F21W 2131/301; F21Y 2103/10; F21Y 2115/10

See application file for complete search history.

(56) References Cited

U.S. PATENT DOCUMENTS

| | | | | | |
|---|---|---|---|---|---|
| 5,001,877 | A * | 3/1991 | Edwards | E04F 19/0436 | 403/295 |
| 5,220,739 | A * | 6/1993 | Chich | G09F 13/04 | 40/550 |
| 5,457,923 | A * | 10/1995 | Logan | E04F 19/0436 | 52/287.1 |
| 5,711,123 | A * | 1/1998 | Lamont | E04F 19/0481 | 52/312 |
| 5,984,486 | A * | 11/1999 | Munz | F21V 21/02 | 211/186 |
| 6,135,621 | A * | 10/2000 | Bach | F21V 33/006 | 74/543 |
| 6,325,523 | B1 * | 12/2001 | Santosuosso | F21V 5/04 | 362/125 |
| 6,461,023 | B1 * | 10/2002 | McLoughlin | F21V 7/09 | 362/348 |
| 6,505,953 | B1 * | 1/2003 | Dahlen | F21V 15/01 | 362/217.08 |
| 6,755,551 | B2 * | 6/2004 | Soorus | F21V 15/01 | 362/217.05 |
| 7,156,694 | B1 * | 1/2007 | Anderson | H01R 25/16 | 439/535 |
| 7,513,659 | B2 * | 4/2009 | Vukosic | F21V 29/70 | 362/547 |
| 7,600,888 | B1 * | 10/2009 | Miller | F21V 33/0012 | 362/217.08 |
| 7,824,055 | B2 * | 11/2010 | Sherman | A47F 11/10 | 362/127 |
| 7,958,685 | B2 * | 6/2011 | Rowohlt | E04F 19/0436 | 52/287.1 |
| 8,128,251 | B2 * | 3/2012 | Huang | G09F 3/204 | 362/125 |
| 8,678,616 | B2 * | 3/2014 | Marquardt | F21V 29/70 | 362/238 |
| 8,696,154 | B2 * | 4/2014 | Hutchens | F21V 11/14 | 362/217.05 |
| D733,353 | S * | 6/2015 | Klus | D26/138 | |
| 9,185,978 | B1 * | 11/2015 | Chen | A47B 95/02 | |
| 9,423,104 | B2 * | 8/2016 | Durkee | F21V 5/02 | |
| 9,435,498 | B1 * | 9/2016 | Anderson | F21V 21/025 | |
| 9,480,346 | B2 * | 11/2016 | Houle | A47F 3/001 | |
| 9,644,836 | B1 * | 5/2017 | Field | F21S 4/28 | |
| 9,679,503 | B2 * | 6/2017 | Weyer | G09F 3/204 | |
| 9,708,819 | B2 * | 7/2017 | Koenigsmark | E04F 19/0436 | |
| 9,883,745 | B2 * | 2/2018 | Gonzales | A47B 95/00 | |
| 9,903,125 | B2 * | 2/2018 | Hoffman | E04F 19/0486 | |
| 10,082,227 | B2 * | 9/2018 | Hoffman | H02G 3/0425 | |
| 10,113,715 | B2 * | 10/2018 | Xue | A47B 96/027 | |
| 10,151,472 | B2 * | 12/2018 | Zeng | F21V 33/0012 | |
| 10,152,904 | B2 * | 12/2018 | Zeng | F21S 4/28 | |
| 10,317,024 | B2 * | 6/2019 | Liu | F21V 7/04 | |
| 10,330,270 | B1 * | 6/2019 | Brannon | F21S 8/03 | |
| 10,676,941 | B1 * | 6/2020 | Hoffman | E04F 19/0436 | |
| 11,140,980 | B2 * | 10/2021 | Breslow | A47B 57/58 | |
| 11,191,359 | B2 * | 12/2021 | Siekmann | A47B 95/02 | |
| 11,335,215 | B2 * | 5/2022 | Eden | G09F 3/204 | |
| 11,808,419 | B1 * | 11/2023 | Chen | F21V 7/005 | |
| D1,057,148 | S * | 1/2025 | Eves | D24/110.4 | |
| 2010/0128480 | A1 * | 5/2010 | Watanabe | F21V 29/89 | 362/249.02 |
| 2010/0146737 | A1 * | 6/2010 | Kunnath | A47B 95/02 | 16/415 |
| 2013/0141906 | A1 * | 6/2013 | Wang | F21V 19/0045 | 362/235 |
| 2014/0313722 | A1 * | 10/2014 | Eloff | F21S 4/22 | 362/418 |
| 2015/0300628 | A1 * | 10/2015 | Dunn | A47F 11/10 | 362/125 |
| 2016/0377258 | A1 * | 12/2016 | Xu | F21V 5/04 | 362/223 |
| 2017/0336064 | A1 * | 11/2017 | Simon | F21S 4/28 | |
| 2020/0170411 | A1 * | 6/2020 | Volkmann | A47B 95/02 | |
| 2022/0151383 | A1 * | 5/2022 | Sponga | A47B 96/021 | |
| 2024/0225279 | A1 * | 7/2024 | Klinkenberg | F21V 33/0012 | |

FOREIGN PATENT DOCUMENTS

| | | | | |
|---|---|---|---|---|
| DE | 102005027200 | A1 | 2/2007 | |
| DE | 202018101927 | U1 | 5/2018 | |
| EP | 3967183 | A1 | 3/2022 | |
| KR | 20100009443 | U * | 9/2010 | A47B 95/02 |
| KR | 200457121 | Y1 | 12/2011 | |
| WO | 2013126946 | A1 | 9/2013 | |
| WO | 2019197092 | A1 | 10/2019 | |

* cited by examiner

FURNITURE BODY HAVING A FRONT PANEL

FIELD AND BACKGROUND OF THE INVENTION

The invention relates to a front panel for a furniture body, which front panel allows an end face of movable furniture parts such as doors, drawers or the like to be gripped from behind, which end face is provided with a handle rail, and which front panel has a chamber for accommodating a lighting means.

Handles for furniture have long been not only handles for operating drawers, doors, flaps or the like, but also decorative means for visually enhancing the front of an item of furniture. These days, the impression of the front of an item of furniture is often improved by the use of handle rails, which extend in particular over the entire width of such a movable furniture part.

In addition to handles that are connected directly to movable furniture parts such as doors, drawers or the like for the operation thereof, illuminated front panels that are recessed relative to a front of a furniture body and allow an end face of these movable furniture parts to be gripped from behind, which end face is provided with a handle rail, have become known.

SUMMARY OF THE INVENTION

It is accordingly an object of the invention to provide a front panel for a furniture body, which overcomes the disadvantages of the heretofore-known devices of this general type, with cost-effective manufacturing as bulk goods sold by length, for example of plastic or metal, and for instance with high-quality aluminum design.

Thanks to the invention, a front panel of the above-described type for the operation of movable furniture parts is provided, which front panel, is based on the fact that the integrally formed front panel has a multiply curved wall that bears the chamber, which has a light exit opening, on a first end portion, and that a bottom is attached to the other end of the wall and at least jointly forms a channel with a second end portion of the curved wall and a mounting plane.

The integral formation of the front panel allows cost-effective manufacturing as bulk goods sold by length, for example consisting of a plastic but also of a metal, for example of aluminum in a high quality design.

The light falling from the lighting means onto the front of the wall creates a light strip, which in particular extends over the entire width of the furniture part, in particular also over an entire item of furniture.

The light falling through the light exit opening of the chamber for accommodating lighting means is also guided by the multiply curved wall along the wall toward the handle rail, and therefore the space between the handle rail of the movable furniture part and the wall is reliably illuminated.

Since the front panel is at least partially recessed relative to the front of the item of furniture, the second end portion of the wall, which initially runs from the movable furniture part in the direction of the body interior, largely prevents light falling into the interior of the item of furniture or illuminating the movable furniture part from behind. It is advantageous here that this second end portion is supported against a mounting plane via the bottom. This provides sufficient mechanical stability. The channel produced thereby can also be used in many ways, for example for wiring.

To fix the front panel to the furniture body, usual connection techniques such as screw-fastening, adhesive bonding or the like are quite suitable. Preferably, however, locking and/or spacer elements for fixing to the furniture body protrude from the back of the wall, which locking and/or spacer elements end at the mounting plane and are for example L-shaped and/or T-shaped in cross section. Locking, for example by insertion into corresponding grooves in the furniture part, possibly one or more mounting plates, is not only a secure fastening but also an invisible one. In the form of spacer elements, these elements define the position of the front panel, for example in a groove in the body. Furthermore, such locking or spacer elements of L-shaped and/or T-shaped cross section reinforce the wall.

The channel over the bottom can thus also be closed in a simple manner by means of a locking and/or spacer element.

In the front panel according to the invention, a channel can also be formed at the top when it is provided for a vertically rising wall portion to be attached to a top side of the chamber, which wall portion is provided with a right-angled bend, which ends in the mounting plane.

If the wall portion is attached to a corner between the top side and a front wall of the chamber, a front of the item of furniture can also be formed jointly by the wall portion.

The stability in the region of the chamber can be increased by the top side of the chamber having an extension that extends into the mounting plane.

The guidance of light along the wall is further improved by the measure that a light exit opening of the chamber, which light exit opening is positioned perpendicularly to the wall, is closed by a bar consisting of a transparent material and having a triangular cross section.

The bar consisting of a transparent material protects the lighting means from dirt and is still easy to clean, for example when used in the kitchen region, in order to ensure optimal exit of light. Because of the triangular cross section, the bar also acts like a light guide that focuses the emitted light.

In structural design terms, it can be provided for the bar and/or an LED strip to be held in grooves in opposing walls of the chamber and/or for projections to protrude from the opposing walls and engage in grooves in the bar and/or in the LED strip.

Even if the lighting means used are LED strips, which have a comparatively long service life, it is still easily possible to exchange them via the end faces of the front panel according to the invention, possibly after removing a covering cap.

The same applies to the bar of transparent material, for example after it has been scratched or dented. It is also possible to change the color without great effort by exchanging the LED strip and/or the bar.

By means of such measures, a closed front view is ensured and a high degree of mechanical stability is achieved.

The highest demands are met by the item of furniture thus obtained with a front panel according to the invention, having a handle rail consisting of a solid profile that has a handle recess and is inserted in a right-angled corner cut-out in an end face of the movable furniture part, and also fits over the end face by means of a projection and engages in the furniture part by means of an underside locking element.

The invention is explained in more detail using the drawings, in which only exemplary embodiments are shown.

DETAILED DESCRIPTION OF THE INVENTION

Figure 1:
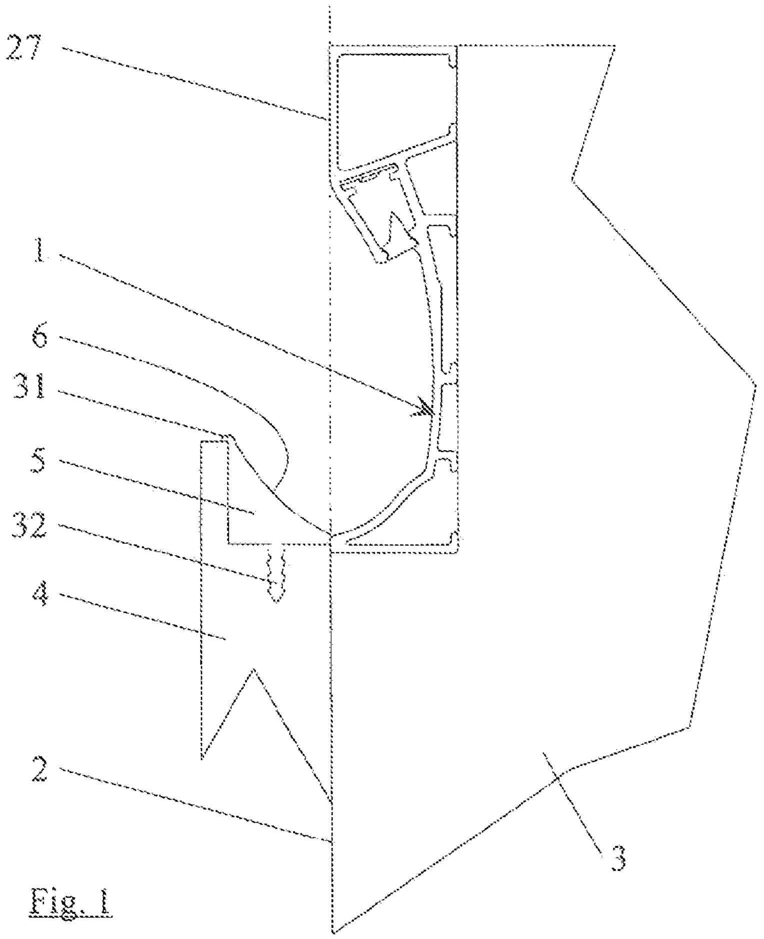
FIG. 1: shows a diagram of the installation situation of a front panel according to the invention.
Figure 2:
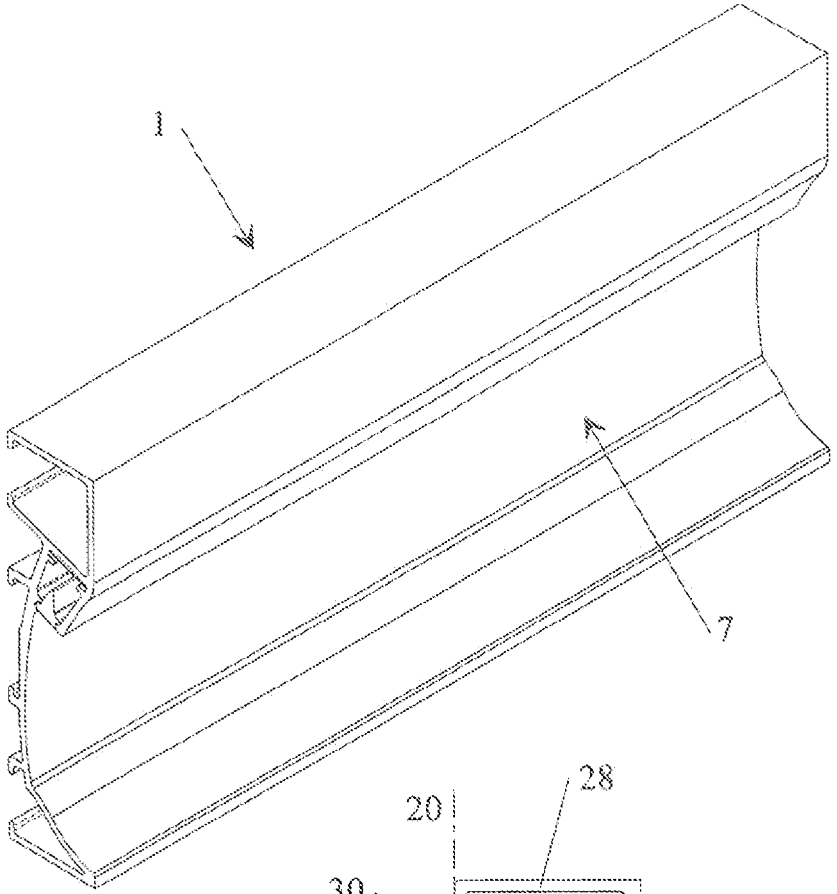
FIG. 2: shows an isometric diagram of the front panel.
Figure 3:
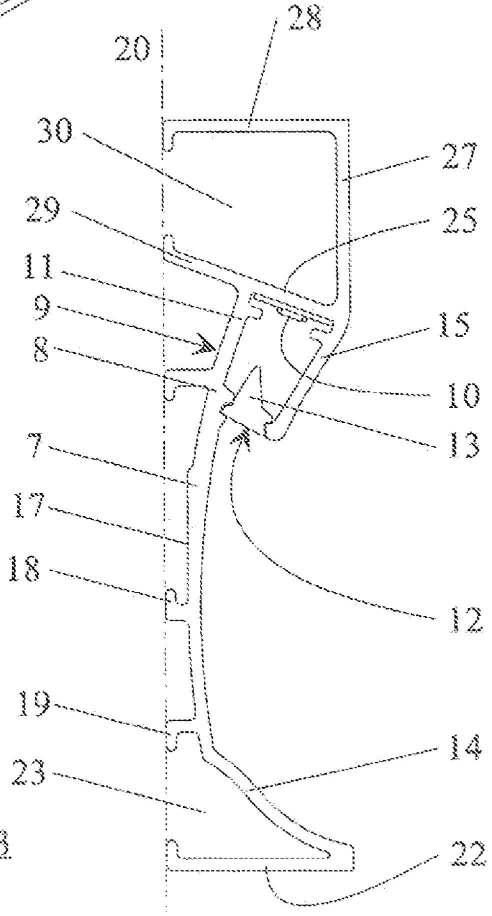
FIG. 3: shows an end view of the front panel.

The integrally formed front panel 1 shown in the drawings is recessed relative to a front 2 of a furniture body 3 far enough to enable a solid handle rail 5 with a handle recess 6 to be gripped from behind in order to operate a movable furniture part 4 such as a door, a drawer or the like.

The front panel 1 is suitable in particular as a horizontal intermediate profile between an upper and lower side of a furniture body.

The front panel 1 has a multiply curved wall 7, which forms a backbone, and bears a chamber 9, which remains visible in a front view of the furniture body 3, for accommodating lighting means 10 on a first end portion 8. The rear wall 11 of the chamber 9 is formed by the wall 7.

The walls of the chamber 9 are opaque and leave a light exit opening 12, which is closed by a bar 13 of triangular cross section consisting of a transparent material.

The light from the lighting means 10 thus falls exclusively through the transparent bar 12 onto the wall 7 and illuminates the interstice between the handle rail 6 and the wall 7. In one view, a light strip thus appears over the length of the front panel 1. A second end portion 14 prevents light falling into the furniture body 3 or illuminating the movable furniture part 4 from behind.

In the chamber 9, the bar 13 is held in a groove in the wall 11 or by a projection of the front wall 15 in a cut-out in the bar 13. The LED strip bearing the lighting means 10 at the end of the chamber 9 opposite the light exit opening 12 is also held in grooves.

To fix the front panel 1 on the furniture body 3, in this case L-shaped, possibly T-shaped locking and/or spacer elements 18, 19 protrude from the back 17 of the wall 7, which locking and/or spacer elements end in a common mounting plane 20 and can be inserted into corresponding grooves in a crosspiece of such a furniture body, possibly into a separately formed fastening plate.

In the front panel 1, a bottom 22 is attached to a second end portion 14 of the wall 7, which second end portion is profiled in an S shape. By means of the bottom 22, which is supported 6 against the mounting plane 20, the wall 7 and in particular the second end portion 14 are provided with sufficient stability. Furthermore, a channel 23 is formed by the bottom and the end portion 14 and in this case is closed against the mounting plane 20 by the spacer element 19.

The first end portion 8 of the wall 7 terminates with a top side 25 at the chamber 9 accommodating the lighting means 10. When the front panel 1 is installed horizontally, a vertically rising wall portion 27, which ends with a right-angled bend 28, adjoins the top side 25, in this case at the corner between the top side 25 and the front wall 15 of the chamber 9. The offset end of the bend 28 lies in the common mounting plane 20, like the other spacer elements 18, 19.

Such a vertically rising wall portion 27 is suitable for jointly forming the front of an item of furniture; cf. FIG. 1. In addition to this, a top channel 30 is formed by the wall portion 27, the bend 28 and an extension 29 of the top side 25 as well as the mounting plane 20.

The handle rail 5 shown in FIG. 1, consisting of a solid profile having the handle recess 6, is inserted into a right-angled corner cut-out, facing the furniture body 3, in an end face of the movable furniture part 4 and fits over the end face of the furniture part 4 by means of a projection 31. A locking element 32 protrudes from the underside of the handle rail 5 and engages in the furniture part 4, for example in the form of a feather that is profiled in a sawtooth shape and engages in an end-face groove in the furniture part 4 in a manner secured against being pulled out.

The invention claimed is:

1. An item of furniture, comprising:
a furniture body including a movable furniture part having an end face with a handle rail,
a one-piece front panel including:
a chamber for accommodating a lighting device,
a curved wall having a front, multiple curvatures, two ends, a first end portion carrying said chamber at one of said ends, and a second end portion, and
a bottom attached to another of said ends of said curved wall, said bottom at least jointly forming a channel with said second end portion and a mounting plane,
said chamber having a light exit opening causing light falling from said chamber through said light exit opening to create a light strip on said front of said curved wall,
said handle rail being formed of a solid profile:
said solid profile having a handle recess permitting said end face of said movable furniture part to be gripped from behind for operating the movable furniture part,
said solid profile being inserted in a right-angled corner cut-out in said end face of said movable furniture part,
said solid profile having a projection projecting over said end face of said movable furniture part, and
said solid profile having an underside locking element engaging in said movable furniture part.

2. The item of furniture according to claim 1, wherein said light strip extends over an entire width of the movable furniture part to provide an indirect illumination of said curved wall.

3. The item of furniture according to claim 1, wherein the furniture parts are doors or drawers.

4. The item of furniture according to claim 1, wherein said curved wall has a back, and at least one of other locking or spacer elements protruding from said back and ending at the mounting plane, for fixing the front panel to the furniture body.

5. The item of furniture according to claim 1, which further comprises at least one of locking or spacer elements closing said channel over said bottom.

6. The item of furniture according to claim 1, wherein said chamber has a top side, a vertically rising wall portion is attached to said top side, and said vertically rising wall portion has a right-angled bend ending in the mounting plane.

7. The item of furniture according to claim 6, wherein said chamber has a front chamber wall forming a corner with said top side of said chamber, and said vertically rising wall portion is attached to said corner.

8. The item of furniture according to claim 7, wherein said top side of said chamber has an extension extending into the mounting plane.

9. The item of furniture according to claim 1, wherein said light exit opening of said chamber is oriented perpendicularly to said curved wall, and a bar formed of a transparent material and having a triangular cross section closes said light exit opening.

10. The item of furniture according to claim 1, wherein said chamber has mutually opposite walls with grooves formed therein, at least one of an LED strip or a bar formed of a transparent material with a triangular cross section closes said light exit opening, and at least one of said LED strip or said bar is held in said grooves.

11. The item of furniture according to claim 1, wherein said chamber has mutually opposite walls, at least one of an LED strip or a bar formed of a transparent material with a triangular cross section closes said light exit opening, and projections protrude from said mutually opposite walls and engage in grooves formed in at least one of said bar or said LED strip.

* * * * *